United States Patent
Suzuki et al.

(10) Patent No.: US 6,507,412 B1
(45) Date of Patent: Jan. 14, 2003

(54) IMAGE RECORDING/REPRODUCING APPARATUS HAVING AN IMPROVED RECORDING SIGNAL GENERATING UNIT

(75) Inventors: Ryoichi Suzuki, Kanagawa (JP); Tomoharu Saito, Osaka (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 09/526,279

(22) Filed: Mar. 15, 2000

(30) Foreign Application Priority Data

Mar. 16, 1999 (JP) .......................................... 11-069678

(51) Int. Cl.⁷ .............................................. G06K 15/00
(52) U.S. Cl. .......................................... 358/1.2; 358/1.6
(58) Field of Search ........................... 358/1.1, 1.2, 1.9, 358/1.6, 1.13, 1.16, 1.17, 449, 298; 382/293, 284, 276, 299, 305; 345/660, 536, 537, 538, 555, 561

(56) References Cited

U.S. PATENT DOCUMENTS 3,976,982 A * 8/1976 Eiselen ........................ 345/561
5,134,495 A * 7/1992 Frazier et al. ................ 360/60

* cited by examiner

Primary Examiner—Arthur G. Evans
(74) Attorney, Agent, or Firm—Dickstein Shapiro Morin & Oshinsky LLP

(57) ABSTRACT

An image recording/reproducing apparatus includes an image signal processing unit which transforms original image data with a first resolution, supplied from an image input device, into a processed image signal with a second resolution. A recording signal generating unit transforms at least one of the original image data and the processed image signal produced by the image signal processing unit, into a recording form. An image recording device stores the processed image signal in the recording form, produced by the recording signal generating unit, into a storage unit, the recording form of the processed image signal being suited to a predetermined data format on the storage unit. An image reproducing device transforms the processed image signal in the recording form, read from the storage unit, into an output-form signal, and displays an image on a display monitor in accordance with the output-form signal.

5 Claims, 3 Drawing Sheets

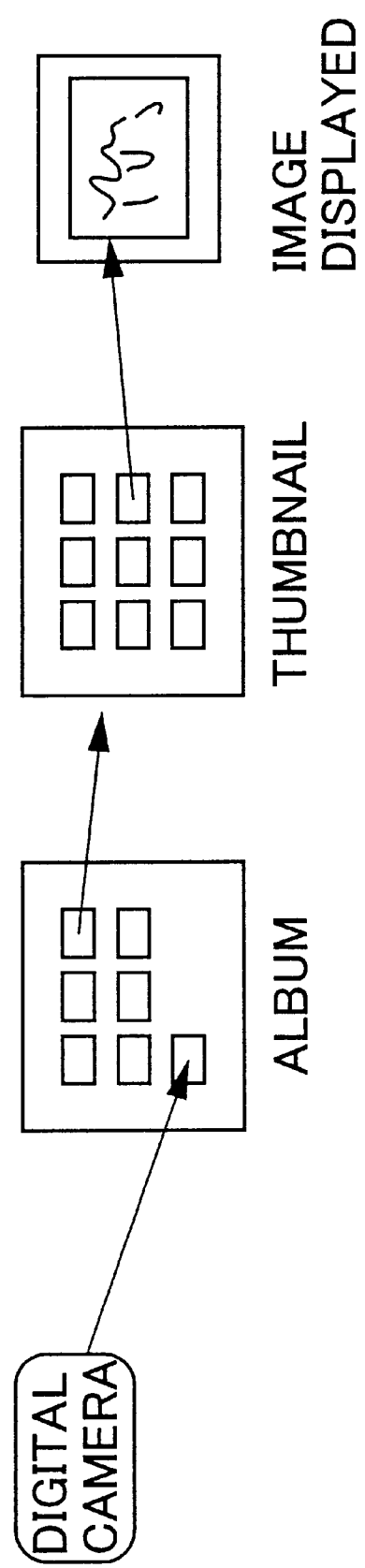

IMAGE RECORDING/REPRODUCING APPARATUS HAVING AN IMPROVED RECORDING SIGNAL GENERATING UNIT

BACKGROUND OF THE INVENTION

1. Field of the Invention

The present invention relates to an image recording/reproducing apparatus which stores and reproduces digital images that are captured by an image input device, such as a digital still camera, an image scanner or a video camera.

2. Description of the Related Art

The development and manufacture of digital cameras in the field become remarkable in these years. In order to view an original image, which was obtained, with an image input device, such as a digital still camera, it was necessary to store the original image data in a memory device of a personal computer prior to the viewing. Hereinafter, such image data captured by the image input device will be called the original image data.

Generally, image reproduction and manipulation for the original image data are performed on a personal computer by using the original image data stored. The image data, produced by the image manipulation or the like, are usually loaded to or recorded in a storage device of the computer, such as a hard disk.

A data format of the original image data and an initial resolution thereof are not always fitted to a display monitor, such as a CRT. In order to allow the displaying and image manipulation of the original image data as well as the storage of manipulated image data, it is necessary to transform the original image with the initial resolution into a processed image signal with a secondary resolution that is fitted to the display monitor.

A digital still camera is typically provided with an internal memory that stores a small amount of the original image data obtained with the digital still camera. However, the capacity of the internal memory of the digital still camera is limited, and a conventional electronic album system is used with the digital still camera to store a large amount of the original image data. The conventional electronic album system typically employs a hard disk of a personal computer as the storage device that stores the original image data.

FIG. 3 is a diagram for explaining an image displaying procedure which is performed by an electronic album system.

As described above, the conventional electronic album system uses a hard disk of a personal computer to store the original image data which was obtained with the digital still camera. The original image data is stored in the hard disk of the computer and the stored image data is used for displaying images on a display monitor of the computer. At a start of an image displaying procedure performed by the conventional electronic album system, for example, a plurality of album items are displayed as an initial image-display screen on the monitor, based on the original image data stored in the hard disk.

During the image displaying procedure shown in FIG. 3, if an operator wishes to view one of the album items within the initial image-display screen on the monitor, the operator selects or clicks the desired one of the album items. This will cause a plurality of thumbnails of digital images, corresponding to the selected album item, to be displayed as a secondary image-display screen on the monitor. Further, if the operator selects or clicks one of the thumbnails, a detailed, enlarged digital image corresponding to the selected thumbnail, will be displayed as a final image-display screen on the monitor.

The conventional electronic album system requires image data processing based on the original image data every time the image-display screen is changed from one to another, in order to display one of the album items, thumbnails or digital images in a proper manner. The image data processing is a complicated task that is difficult to accomplish it at any time, and the time needed for completion of the image data processing for each screen change tends to be longer. In a certain case, the computer hangs up during the image displaying procedure, so that the image is not displayed in a proper manner.

As described above, in order to allow the displaying and manipulation of the original image data, it is necessary to transform the original image data with the initial resolution into a processed image signal with a secondary resolution. For example, when a plurality of thumbnails of digital images are displayed, the above electronic album system has to perform image compression of the original image data into a smaller size. When a detailed, enlarged digital image corresponding to the selected thumbnail is displayed, the above electronic album system has to transform the original image data with the initial resolution into the processed image signal with the secondary resolution that is fitted to the display monitor.

Typical resolutions of original image data obtained by digital still cameras are: 320 by 240 pixels, 640 by 480 pixels, 768 by 480 pixels, 1280 by 960 pixels, etc. A typical resolution of the VGA (video graphics array), widely used in personal computers, is 640 by 480 pixels. In the case of the above electronic album system, if an original image with the low resolution of 320 by 240 pixels were displayed directly on the display monitor, only one fourth of the image-display screen on the monitor is used to display the image. Further, in the case of the above electronic album system, if an original image with a high resolution of 768 by 480 pixels or 1280 by 960 pixels were displayed, only a part of the original image is displayed as the image-display screen on the VGA-based monitor, and the remaining portion of the original image will be discarded.

In order to eliminate the above problems, the conventional electronic album system must carry out the image data processing every time the image-display screen is changed from one to another during the image displaying procedure of FIG. 3, in order to display one of the album items, thumbnails or digital images in a proper manner. In particular, when a large amount of the original image data is stored in the hard disk, it is difficult for the conventional electronic album system to accomplish the image data processing for each screen change and display a selected image at any time. It is difficult for the conventional electronic album system to quickly display a selected image in response to the operator's action because the image data processing based on the original image data is time-consuming.

SUMMARY OF THE INVENTION

In order to overcome the problems described above, preferred embodiments of the present invention provide an improved image recording/reproducing apparatus that allows quick image displaying and manipulation of a large amount of the original image data by using the processed image signal in the recording form stored in and read out from a storage unit, and allows the outputting of an entire image with a high resolution to an output device when a high-resolution output request is supplied from a control input device.

According to one preferred embodiment of the present invention, an image recording/reproducing apparatus includes: an image signal processing unit which transforms original image data with a first resolution, supplied from an image input device, into a processed image signal with a second resolution; a recording signal generating unit which transforms at least one of the original image data and the processed image signal produced by the image signal processing unit, into a recording form; an image recording device which stores the processed image signal in the recording form, produced by the recording signal generating unit, into a storage unit, the recording form of the processed image signal being suited to a predetermined data format on the storage unit; and an image reproducing device which transforms the processed image signal in the recording form, read from the storage unit, into an output-form signal, and displays an image on a display monitor in accordance with the output-form signal.

In the image recording/reproducing apparatus of the preferred embodiment, the recording signal generating unit transforms at least one of the original image data and the processed image signal produced by the image signal processing unit, into the recording form to be stored in the storage unit, and the image reproducing device transforms the processed image signal in the recording form, read from the storage unit, into the output-form signal, and displays an image on the display monitor in accordance with the output-form signal. The image recording/reproducing apparatus of the present invention is effective in providing quick image displaying and manipulation of a large amount of the original image data.

Further, in the image recording/reproducing apparatus of the preferred embodiment, the image reproducing device includes a reproducing signal generating unit which reads one of the original image data in the recording form or the processed image signal in the recording form from the storage unit. When the first resolution is higher than the second resolution and a high-resolution output request is supplied from a control input device, the reproducing signal generating unit transforms the first resolution original image data in the recording form, read from the storage unit, into the output-form signal, and outputs the output-form signal to a printer. The image recording/reproducing apparatus of the present invention is effective in outputting an entire image with a high resolution to the printer when the high-resolution output request is supplied from the control input device.

BRIEF DESCRIPTION OF THE DRAWINGS

Other objects, features and advantages of the present invention will become apparent from the following detailed description when read in conjunction with the accompanying drawings in which:

FIG. 3 is a diagram for explaining an image displaying procedure which is performed by an electronic album system.

DETAILED DESCRIPTION OF PREFERRED EMBODIMENTS

A description will now be provided of preferred embodiments of the present invention with reference to the accompanying drawings.

Figure 1:
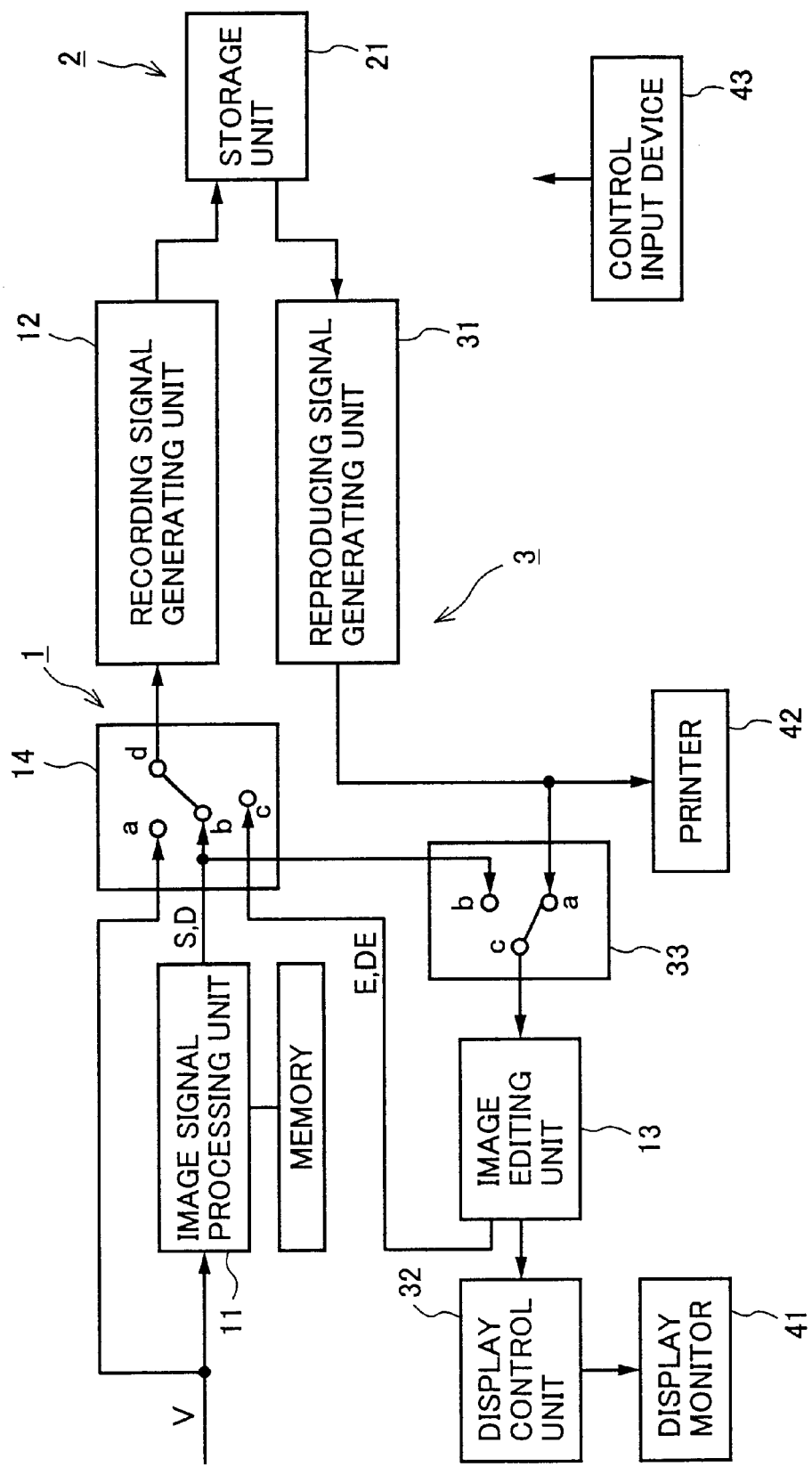
FIG. 1 is a block diagram of one preferred embodiment of the image recording/reproducing apparatus according to the present invention.

FIG. 1 shows one preferred embodiment of the image recording/reproducing apparatus according to the present invention.

As shown in FIG. 1, the image recording/reproducing apparatus of the present embodiment generally has an image signal device 1, an image recording device 2, and an image reproducing device 3. A display monitor 41, a printer 42, and a control input device 43, such as a keyboard, are connected to the image recording/reproducing apparatus as input/output devices.

In the image recording/reproducing apparatus of FIG. 1, the image signal device 1 includes an image signal processing unit 11, a recording signal generating unit 12, an image editing unit 13, and a recording signal selector 14.

The image signal processing unit 11 receives an original image signal "V" from an original image signal line. The original image signal line is connected to an external image input device (not shown), such as a digital still camera. The external image input device captures an original image and supplies the original image signal V having an initial resolution on the original image signal line to the image signal processing unit 11. The image signal processing unit 11 transforms the original image signal V with the initial resolution into a processed image signal "D" with a secondary resolution. The secondary resolution of the processed image signal D is suited to a predetermined resolution of the display monitor 41 in the image recording/reproducing apparatus. The processed image signal D is supplied from the image signal processing unit 11 to the recording signal generating unit 12 via the recording signal selector 14.

The recording signal selector 14 has a first input "a" connected directly to the original image signal line, a second input "b" connected to an output of the image signal processing unit 11, a third input "c" connected to an output of the image editing unit 13, and an output "d" connected to an input of the recording signal generating unit 12. The recording signal selector 14 selects one of the original image signal V received at the first input "a", the processed image signal D received at the second input "b", and a manipulated image signal DE received at the third input "c" (which will be described later). The selected image signal is supplied from the output "d" of the recording signal selector 14 to the recording signal generating unit 12.

The recording signal generating unit 12 receives at least one of the original image signal V and the processed image signal D from the recording signal selector 14. The recording signal generating unit 12 transforms at least one of the original image signal V and the processed image signal D produced by the image signal processing unit 11, into a recording form.

The image recording device 2 stores the processed image signal D in the recording form, produced by the recording signal generating unit 12, into a storage unit 21. The recording form of the processed image signal D is suited to a predetermined data format on the storage unit 21.

The image reproducing device 3 transforms the processed image signal D in the recording form, read from the storage unit 21, into an output-form signal, and displays an image on the display monitor 41 in accordance with the output-form signal.

As described above, the image signal processing unit 11 carries out the resolution transformation for the original image data V. In a certain case, image manipulation procedures, such as image quality adjustment, color transformation, trimming and image compression and decompression, may have to be performed on the original image data V. The image editing unit 13 carries out the image manipulation.

In the image recording/reproducing apparatus of FIG. 1, the image editing unit 13 produces the manipulated image signal DE as a result of image manipulation of the original image data D based on the processed image signal D in the recording form read from the storage unit 21. The manipulated image signal DE is supplied from the image editing unit 13 to a display control unit 32. At the same time, the manipulated image signal DE is supplied through the recording signal generating unit 12 to the storage unit 21, and the image recording device 2 stores the manipulated image signal DE in the recording form into the storage unit 21. The image reproducing device 3 displays an image on the display monitor 41 in accordance with the output-form signal corresponding to the manipulated image signal DE.

Further, in the image recording/reproducing apparatus of FIG. 1, the image signal processing unit 11 produces a thumbnail image signal "S" from the original image data V. The recording signal generating unit 12 transforms the thumbnail image signal S into the recording form. The thumbnail image signal S in the recording form is stored in the storage unit 21.

In the image recording/reproducing apparatus of FIG. 1, the storage unit 21 stores various kinds of image signals in the recording form supplied by the recording signal generating unit 12. The storage unit 21 is a mass-storage device that is capable of storing a large amount of digital image information. Typical examples of the storage unit 21 are a mass-storage floppy disk drive, a compact disk-recordable (CD-R) drive, a compact disk-rewritable (CD-RW) drive, a mini-disk (MD) drive, a magnetic tape device, a hard disk drive (HDD), etc.

Figure 2:
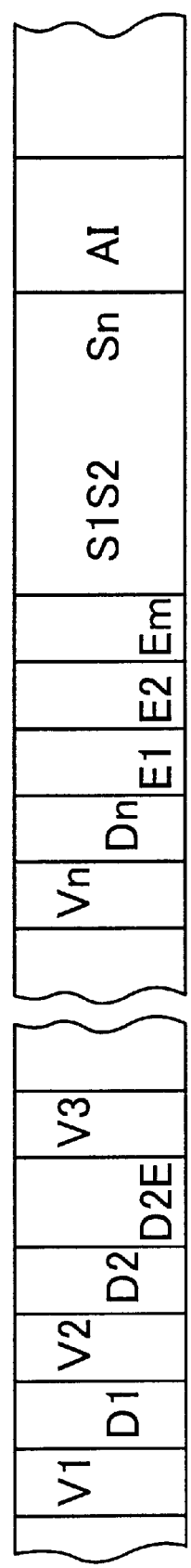
FIG. 2 is a diagram for explaining an arrangement of image data elements recorded on a recording unit of the image recording/reproducing apparatus of the present embodiment.

FIG. 2 shows an arrangement of data elements stored in the storage unit 21 of the image recording/reproducing apparatus of the present embodiment.

In the arrangement of data elements shown in FIG. 2, V1, V2, ..., Vn denote the original image signal in the recording form, which correspond to "n" digital images captured by the digital still camera (where n is an integer). D1, D2, ..., Dn denote the processed image signal in the recording form, which correspond to the "n" digital images. The processed image signal D1, D2, ..., Dn have a second resolution that is suited to a predetermined resolution of the display monitor 41.

Further, in the arrangement of data elements of FIG. 2, E1, E2, ..., Em denote a plurality of manipulate information parameters, which correspond to "m" digital images that are manipulated by the image editing unit 13 (where "m" is an integer smaller than "n"). "D2E" denotes a manipulated image signal, which corresponds to the result of manipulation for the processed image signal D2 that incorporates the manipulate information parameter E2. The manipulated image signal D2E is also one of the processed image signal in the recording form produced by the recording signal generating unit 12.

Further, in the arrangement of the data elements of FIG. 2, S1, S2, ..., Sn denote a set of thumbnail image signal in the recording form, which correspond to thumbnails of the "n" digital images. The original image signal V1, V2, ..., Vn are subjected to image compression to produce the thumbnail image signal S1, S2, ..., Sn. In the present embodiment, the thumbnail image signal S1, S2, ..., Sn are stored in successive recording areas of the storage unit 21 as shown in FIG. 2. The thumbnail image signal S1, S2, ..., Sn are read out from the storage unit 21 in order to display the thumbnails of the digital images on the monitor 41 at once, as shown in FIG. 3.

Further, in the arrangement of the data elements of FIG. 2, AI denotes album information parameters which describe the number of digital images contained in an album, the states of image manipulation to the original image signal, and the information related to the thumbnail image signal. In the present embodiment, the album information parameters AI are read out from the storage unit 21, in order to ensure quick image displaying and manipulation of the original image signal with respect to one of the album items. Specifically, the album information parameters Al include the data size, the data positions and the correlations between the data elements.

The data elements V1, D1, ..., and AI, in the arrangement shown in FIG. 2, are a collection of the original and processed image signal that correspond to one of the album items as in the electronic album system of FIG. 3. Subsequent data elements corresponding to collections of the original image signal for subsequent ones of the album items may be stored into subsequent recording areas of the storage unit 21 in a similar manner to the data elements shown in FIG. 2.

In the image recording/reproducing apparatus of FIG. 1, the image reproducing device 3 includes a reproducing signal generating unit 31, a display control unit 32, and a display signal selector 33. The reproducing signal generating unit 31 transforms the processed image signal in the recording form, read from the storage unit 21, into an output-form signal, and outputs the output-form signal to the display signal selector 33. When the display control unit 32 is controlled in accordance with the output-form signal supplied by the reproducing signal generating unit 31, images that correspond to the output-form signal are displayed on the display monitor 41 by the display control unit 32.

The display signal selector 33 has a first input "a" connected to an output of the reproducing signal generating unit 31, a second input "b" connected to an output of the recording signal selector 14 (or connected directly to the output of the image signal processing unit 11), and an output "c" connected to an input of the image editing unit 13. One of the processed image signal D received at the input "b" from the image signal processing unit 11 and the processed image signal D in the recording form received at the input "a" from the reproducing signal generating unit 31 are selected by the display signal selector 33, and the selected image signal are supplied from the output "c" of the display signal selector 33 to the image editing unit 13.

The image editing unit 13 produces the manipulated image signal DE as a result of image manipulation of the original image data D based on the processed image signal in the recording form read from the storage unit 21. The manipulated image signal DE is supplied from the image editing unit 13 to the display control unit 32. At the same time, the manipulated image signal DE is supplied through the recording signal generating unit 12 to the storage unit 21, and the image recording device 2 stores the manipulated image signal DE in the recording form into the storage unit 21. The image reproducing device 3 displays an image on the display monitor by controlling the display control unit 32 in accordance with the output-form signal corresponding to the manipulated image signal DE.

Further, in the image recording/reproducing apparatus of FIG. 1, the image signal processing unit 11 produces thumbnail image signals "S1, S2, ..., Sn" from the original image data "V1, V2, ..., Vn". The recording signal generating unit 12 transforms the thumbnail image signals "S1, S2, ..., Sn" into the recording form. The thumbnail image signals "S1, S2, ..., Sn" in the recording form are stored in successive recording areas of the storage unit 21 as shown in FIG. 2. Hence, the image recording/reproducing apparatus of the present embodiment is effective in providing quick image displaying and manipulation of a large amount of the original image data.

The recording areas of the storage unit 21 where the thumbnail image signals S1, ..., Sn are stored may be provided at fixed locations separate from the recording areas of the storage unit 21 where the original and processed image signals are stored. Each of the thumbnail image signals S1, ..., Sn may be written to the storage unit 21 every time the original image data V is supplied by the image input device. Alternatively, all the thumbnail image signals S1, ..., Sn may be temporarily stored in the electronic album system after all the original images are captured by the image input device, and then they may be loaded into the storage unit 21 at once.

As described above, the image signal processing unit 11 transforms the original image data V with the initial resolution into the processed image signal D with the secondary resolution, the secondary resolution being suited to a predetermined resolution of the display monitor 41. The recording signal generating unit 12 transforms the processed image signal D produced by the image signal processing unit 11, into the recording form, so that the processed image signal D in the recording form is stored in one of successive recording areas of the storage unit 21. The image recording/reproducing apparatus of the present embodiment is effective in providing quick image displaying and manipulation of a large amount of the original image data.

In the image recording/reproducing apparatus of FIG. 1, the reproducing signal generating unit 31 reads one of the original image data V in the recording form or the processed image signal D in the recording form from the storage unit 21. When the initial resolution of the original image data V is higher than the secondary resolution of the processed image signal D and a high-resolution output request is supplied from the control input device 43, the reproducing signal generating unit 31 transforms the initial-resolution original image data V in the recording form, read from the storage unit 21, into the output-form signal, and outputs the output-form signal to the printer 42. Hence, the image recording/ reproducing apparatus of the present embodiment is effective in outputting an entire image with a high resolution to the printer 42 when the high-resolution output request is supplied from the control input device 43.

In the above-described embodiment, various kinds of image signals in the recording form are supplied from the recording signal generating unit 12, and stored in the storage unit 21. The reproducing signal generating unit 31 reads out the processed image signal in the recording form from the storage unit 21 and transforms it into the output-form signal. The output-form signal is supplied to the display control unit 32 so that an image is displayed on the monitor 41 by the display control unit 32 in accordance with the output-form signal. The image recording/reproducing apparatus of the present embodiment is effective in increasing the operability of the electronic album system to which the image recording/reproducing apparatus of the present embodiment is applied.

In the above-described embodiment, the display control unit 32 receives the manipulated image signal DE from the image editng unit 13 or the output-form signal from the reproducing signal generating unit 31, and transforms the image signal (Y-CB-Cr signal of standard digital still cameras) into a displaying signal that is suited to a predetermined displaying format, such as composite NTSC format or RGB signal format. Hence, an image that corresponds to one of the digital images obtained with the image input device is displayed on the display monitor 41 by the display control unit 32 in accordance with the output-form signal.

The image recording/reproducing apparatus of the present embodiment automatically starts the execution of the above-described image displaying and manipulation once the original image data V from the image input device is received. However, the basic operational instructions, such as the high-resolution output request, are manually supplied to the image recording/reproducing apparatus by the operator using the control input device 43.

The present invention is not limited to the above-described embodiments, and variations and modifications may be made without departing from the scope of the present invention.

Further, the present invention is based on Japanese priority application no. 11-069678, filed on Mar. 16, 1999, the entire contents of which are hereby incorporated by reference.

What is claimed is:

1. An image recording/reproducing apparatus comprising:
    an image signal processing unit for transforming original image data with a first resolution, supplied from an image input device, into a processed image signal with a second resolution;
    a recording signal generating unit for transforming at least one of the original image data and the processed image signal produced by the image signal processing unit, into a recording form;
    an image recording device for storing the processed image signal in the recording form, produced by the recording signal generating unit, into a storage unit, the recording form of the processed image signal being suited to a predetermined data format on the storage unit; and
    an image reproducing device for transforming the processed image signal in the recording form, read from the storage unit, into an output-form signal, and for displaying an image on a display monitor in accordance with the output-form signal.

2. The image recording/reproducing apparatus according to claim 1, wherein the image reproducing device includes a reproducing signal generating unit, the reproducing signal generating unit reading one of the original image data in the recording form or the processed image signal in the recording form from the storage unit, wherein, when the first resolution is higher than the second resolution and a high-resolution output request is supplied from a control input device, the reproducing signal generating unit transforms the first-resolution original image data in the recording form, read from the storage unit, into the output-form signal, and outputs the output-form signal to a printer.

3. The image recording/reproducing apparatus according to claim 2, further comprising an image editing unit provided between a display control unit and the reproducing signal generating unit, the image editing unit producing manipulated image signal as a result of image manipulation of the original image data based on the processed image signal in the recording form read from the storage unit, wherein the image recording device stores the manipulated image signal in the recording form into the storage unit, and the image reproducing device displays an image on the display monitor by the display control unit in accordance with the output-form signal corresponding to the manipulated image signal.

4. The image recording/reproducing apparatus according to claim 1, wherein the image signal processing unit produces thumbnail image signal from the original image data, and the recording signal generating unit transforms the thumbnail image signal into the recording form, the thumbnail image signal in the recording form being stored in successive recording areas of the storage unit.

5. The image recording/reproducing apparatus according to claim 1, wherein the image signal processing unit transforms the original image data with the first resolution into the processed image signal with the second resolution, the second resolution being suited to a predetermined resolution of the display monitor, and the recording signal generating unit transforming the processed image signal produced by the image signal processing unit, into the recording form, so that the processed image signal in the recording form are stored in successive recording areas of the storage unit.

* * * * *